Dec. 4, 1951     E. G. NEWSOM     2,576,963
RADIO DISTANCE MEASURING SYSTEM
Filed Jan. 14, 1946
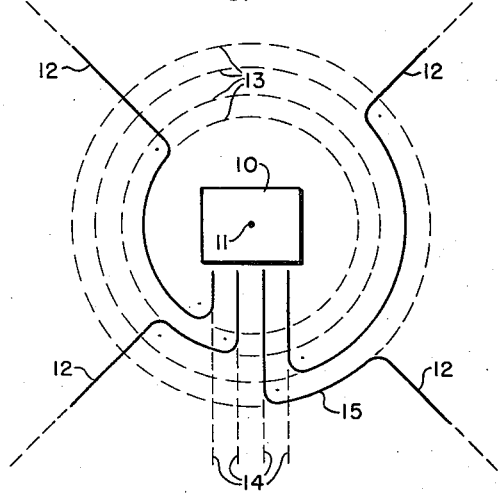
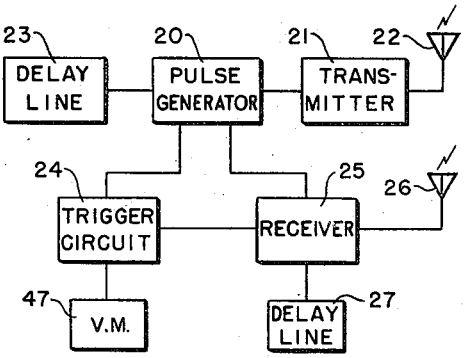
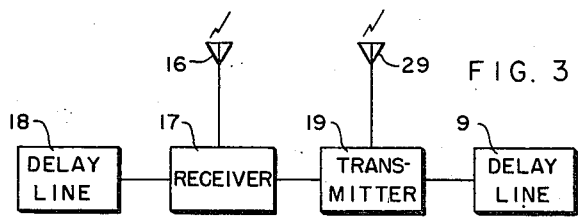
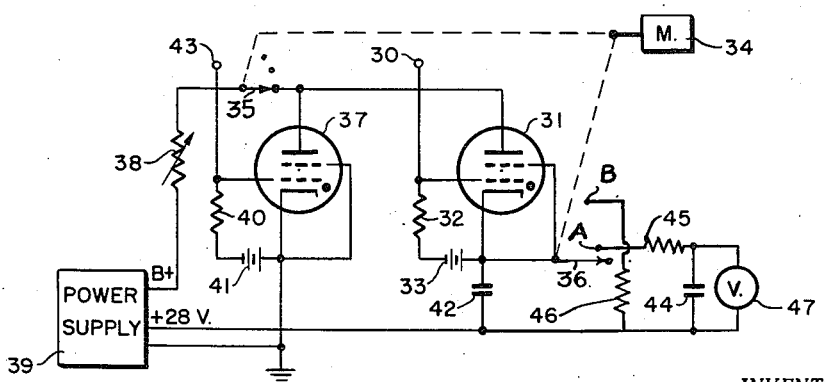
INVENTOR.
EARL G. NEWSOM
BY Lawrence Glassman
ATTORNEY Patented Dec. 4, 1951

2,576,963

UNITED STATES PATENT OFFICE 2,576,963

RADIO DISTANCE MEASURING SYSTEM

Earl G. Newsom, Dayton, Ohio

Application January 14, 1946, Serial No. 641,161

3 Claims. (Cl. 343—13)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to airport traffic control systems and more particularly to improved radio distance-measuring apparatus for use in such systems.

Certain proposed methods of handling airport traffic involve flying the aircraft in circular courses at predetermined radii about a given control point. Each aircraft as it enters the airport zone is assigned a particular course which extends from the point of entry circumferentially to the region controlled by the usual localizer beam and glide path. An object of the present invention is to provide a novel distance-measuring apparatus which enables the pilot of an aircraft to maintain a predetermined radius relative to a given point with a high degree of accuracy.

Other objects, features and advantages of the present invention will suggest themselves to those skilled in the art and will become apparent from the following description of the invention taken in connection with the accompanying drawing in which:

Figure 1 is a diagrammatic plan view of an airport traffic control system as contemplated by the present invention;

Figure 2 is a block diagram showing the airborne equipment of the distance-measuring apparatus;

Figure 3 is a block diagram showing the ground equipment of the distance-measuring apparatus; and Figure 4 is a schematic illustration of a trigger circuit embodied in the airborne equipment.

Referring now to Figure 1, there is illustrated an airport designated by the rectangle 10 having a control point 11 in the center thereof. Each aircraft flies into the airport zone on one of the range courses 12, turns in an assigned direction and flies along one of the circular courses 13 at an assigned radius, finally turning onto an assigned localizer course 14 and landing on the glide path. While the illustrated system is adapted to accommodate four aircrafts concurrently, it will be understood that the present invention is not limited to this precise number.

During the time in which an aircraft is following a circular course such as indicated, for example, by the solid curved line 15, the pilot is required to keep his aircraft at a given distance from the control point 11. One of the purposes of the present invention is to provide the pilot with continuous, accurate data as to his distance from this control point.

The airborne equipment of the distance-measuring apparatus is shown in block form in Figure 2. A pulse generator 20 periodically generates a pulse which triggers the transmitter 21. A pulse of radio-frequency energy is radiated by the antenna 22, and concurrently, a pulse is started down the delay line 23 associated with the pulse generator 20. This delay line may be of any conventional construction and is not shown in detail herein. Preferably, it is adjustable in increments and its purpose is to cause a second pulse to be sent by the transmitter 21 at a selected interval following the first pulse. The pilot adjusts the length of the delay line 23 to select a particular ground station according to the required spacing between each pair of pulses. A typical set of values would be one microsecond duration for each pulse, with spacing between pulses adjustable from four microseconds to 48 microseconds in increments of four microseconds. A pair of pulses would be generated about once per second.

The second pulse, which is reflected by the delay line 23, is also effective to excite a trigger circuit 24 and turn on a receiver 25 for a predetermined period, say 1000 microseconds. The trigger circuit 24 is illustrated schematically in Figure 4 and forms an important feature of the present invention. The initiating pulse which begins the time interval to be measured is introduced at the terminal 30, Figure 4, which is connected to the control grid of a thyratron tube 31. The control grid is connected to the cathode of tube 31 through grid resistor 32 and a suitable bias voltage source 33 which normally keeps the tube in a nonconducting state. A suitable motor 34 actuates switches 35 and 36 in a sequence which will become evident as the description progresses. A second thyratron 37 is provided, its anode being connected to the anode of thyratron 31, and the anodes of both thyratrons are connected through switch 35 and variable resistor 38 to a suitable source of positive voltage, shown as a power supply 39. The control grid of thyratron 37 is connected to its cathode through a grid resistor 40 and a suitable bias voltage source 41, which normally keeps the thyratron in a nonconducting state. The cathode of thyratron 37 is connected to ground, while the cathode of thyratron 31 is connected through a capacitor 42 to power supply 39 at some point above ground potential, say, for example, 28 volts.

When the initiating pulse is applied to terminal 30, as stated above, switch 36 is open and switch 35 is closed. These switches remain in such position for a time longer than that required for the arrival of the returned pulse which terminates the time interval being measured. The initiating pulse fires thyratron 31, which starts conducting, thereby charging the capacitor 42.

The pair of pulses transmitted by the airborne equipment is picked up by an antenna 16 associated with a receiver 17, Figure 3, in a particular ground set. A delay line 18 is associated with the receiver 17 so that the equipment is responsive only to pairs of signals having a predetermined spacing. Assuming that a pair of pulses having the required spacing is received, a transmitter 19 in the ground set is triggered on and, in conjunction with an associated delay line 9, is effective to transmit a pair of pulses having a predetermined spacing from the antenna 29. These pulses are picked up by the antenna 26, Figure 2, in the airborne set and are fed to the receiver 25 which has a delay line 27 associated therewith so that it responds only to pulses having a predetermined separation. The returned pulse terminating the time interval is applied by the receiver 25 to the terminal 43 in the trigger circuit shown in Figure 4.

Application of a pulse to terminal 43 causes the thyratron 37 to fire and start conducting. The anode of the thyratron 31 thereupon becomes negative with respect to its cathode, thereby stopping the flow of current through the tube and consequently stopping the charging of capacitor 42. The magnitude of the charge on capacitor 42 is thus dependent on the time interval between the initiating and the terminating pulse and is therefore a function of the distance from the source of the initiating pulse to the source of the terminating pulse.

At a point in time after the firing of thyratron 37 but before the next initiating pulse, switch 35 is open and switch 36 moves from the open position to position A. The plate voltage supply to both thyratrons is thus interrupted, and thyratron 37 returns to a nonconducting state, thyratron 31 already being in a nonconducting state as explained previously. With switch 36 in position A, a memory capacitor 44 is charged through a resistor 45 to a value substantially equal to the charge developed across capacitor 42 during the measured time interval. Capacitor 44 is preferably of a relatively small value to minimize the slight error introduced in the process of charging it. Switch 36 then moves to position B and remains there long enough to allow capacitor 42 to discharge through resistor 46. Switch 35 then closes and switch 36 returns to the open position before the next initiating pulse is applied to the control grid of thyratron 31, whereupon the cycle is repeated. A low pulse repetition rate may be employed, a complete cycle occurring, for example, once every second, the memory capacitor 44 maintaining the indicating charge.

A suitable indicator, such as a voltmeter 47 is connected across the terminals of capacitor 44. The indicator may be calibrated in terms of time or directly in terms of distance as desired, and provides the pilot with continuous and accurate information as to his range to the control point 11 as illustrated in Figure 1.

Small fixed errors in the system can be corrected by proper calibration of voltmeter 47 and by proper adjustment of variable resistor 38. If power supply 39 includes a current regulating network, the calibration of voltmeter 47 may be made substantially linear. Other means for translating the charge developed across capacitor 42 into indications of distance are set forth in detail in my copending patent application entitled "Radar Range Indicator," Serial No. 685,884, filed July 24, 1946, Patent No. 2,511,868.

The trigger circuit herein described is capable of measuring extremely short time intervals in the order of small fractions of a microsecond. By employing two thyratrons with their cathodes at different fixed potentials, the time intervals may be demarcated by the ionization times of the thyratrons, one initiating the time interval, and the other terminating it. Furthermore, the present invention permits the use of very low pulse repetition rates thereby simplifying a radio control system for aircraft traffic where many channels may be required.

It should be understood that the time measuring system as set forth herein may be advantageously employed wherever time intervals between discrete pulses are to be measured with accuracy. Thus the present invention may find use in pulse-echo radar systems where a slow repetition rate, high accuracy, and convenient indicating means are required.

While there has been what is considered to be a preferred embodiment of the present invention set forth herein by way of illustration, it will be obvious to those skilled in the art that various changes and modifications may be made therein without departing from the spirit and scope of the invention as defined by the appended claims.

What is claimed is:

1. A radio distance measuring system, comprising at a first point a first radiant energy transmitter, a pulse generator for generating of a first pulse, said pulse generator being coupled to and triggering said transmitter, first signal delay means coupled to said pulse generator for deriving a second pulse in response to said first pulse after a given time interval with respect thereto, said first and second pulses forming an associated pair having a predetermined spacing with respect to time and serving to cause said first transmitter to transmit a pair of pulses of radiant energy having said predetermined spacing, a first radiant energy receiver connected to said pulse generator to be rendered operative for a given period in response to said second pulse, means initially responsive to said second pulse for providing a measure of the time interval between said second pulse and a responding pulse received by said first receiver, said last-named means being coupled to said pulse generator and said first receiver, second signal delay means for rendering said first receiver responsive only to pairs of pulses having a predetermined spacing with respect to time, and an indicator providing an indication of the time interval between said second pulse and a corresponding responding pulse coupled to said measure providing means; said system comprising, at a second point, a second radiant energy receiver, third signal delay means for rendering said second receiver responsive only to pairs of pulses from said first transmitter having said predetermined spacing, a second transmitter responsive to be triggered into operability by said second receiver, and fourth signal delay means for effecting a transmission by said second transmitter of a responding pair of pulses having said predetermined spacing with respect to time, said measure providing means being responsive to the second of said responding pair of pulses to provide the measure of the time interval between the second of said responding pair of pulses and said second pulse.

2. In radio distance measuring apparatus, an interrogating system, for use with a system operatively associated therewith for receiving pulses from said interrogating system and transmitting responding pulses, comprising a radiant energy transmitter, a pulse generator for generating a first pulse, said pulse generator being coupled to and triggering said transmitter, signal delay means for deriving a second pulse in response to said first pulse after a given time interval with respect thereto coupled to said pulse generator, said first and second pulses forming an associated pair having a predetermined spacing with respect to time and serving to cause said transmitter to transmit a pair of pulses of radiant energy having said predetermined spacing, a first radiant energy receiver connected to said pulse generator to be rendered operative for a given period in response to said second pulse, means for providing a measure of the time interval between said second pulse and the second pulse of a responding pulse pair received by said first receiver, said last-named means being coupled to said pulse generator and said receiver, signal delay means for rendering said first receiver responsive only to pairs of pulses having a predetermined spacing with respect to time, and an indicator providing an indication of the time interval between said second pulse and the second of a pair of responding pulses coupled to said measure providing means.

3. A radio distance measuring apparatus, according to claim 2, wherein said time interval measure providing means includes means for a substantially permanent storage of the measure of said time interval, whereby substantially continuous information is available for said indicator.

EARL G. NEWSOM.

REFERENCES CITED

The following references are of record in the file of this patent:

UNITED STATES PATENTS

| Number | Name | Date |
|---|---|---|
| 1,750,668 | Green | Mar. 18, 1930 |
| 2,055,883 | Terry | Sept. 29, 1936 |
| 2,248,727 | Strobel | July 28, 1941 |
| 2,301,195 | Bradford | Nov. 10, 1942 |
| 2,396,898 | Storm | Mar. 19, 1946 |
| 2,405,239 | Seeley | Aug. 6, 1946 |
| 2,410,868 | De Forest | Nov. 12, 1946 |
| 2,412,963 | Chatterjea et al. | Dec. 24, 1946 |
| 2,415,359 | Loughlin | Feb. 4, 1947 |

FOREIGN PATENTS

| Number | Country | Date |
|---|---|---|
| 469,417 | Great Britain | July 26, 1937 |